Aug. 10, 1971  R. G. NOBLE  3,598,676
METHOD OF MAKING A BIAS WEAVE HONEYCOMB CORE STRUCTURE
Filed July 25, 1968  2 Sheets-Sheet 2
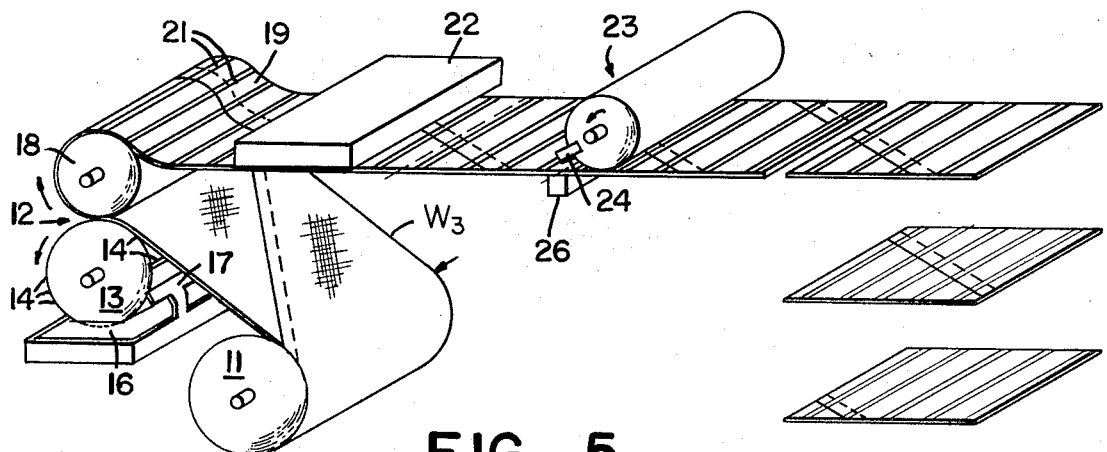
FIG_5
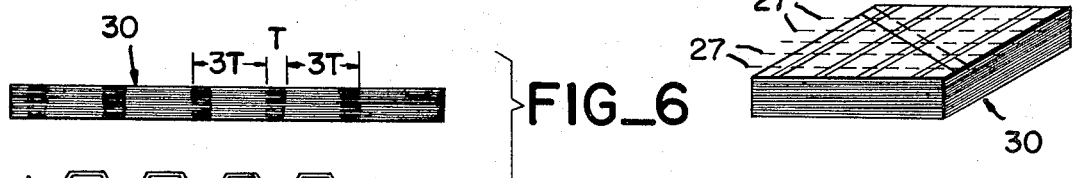
FIG_6
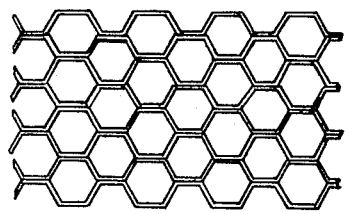
FIG_6A
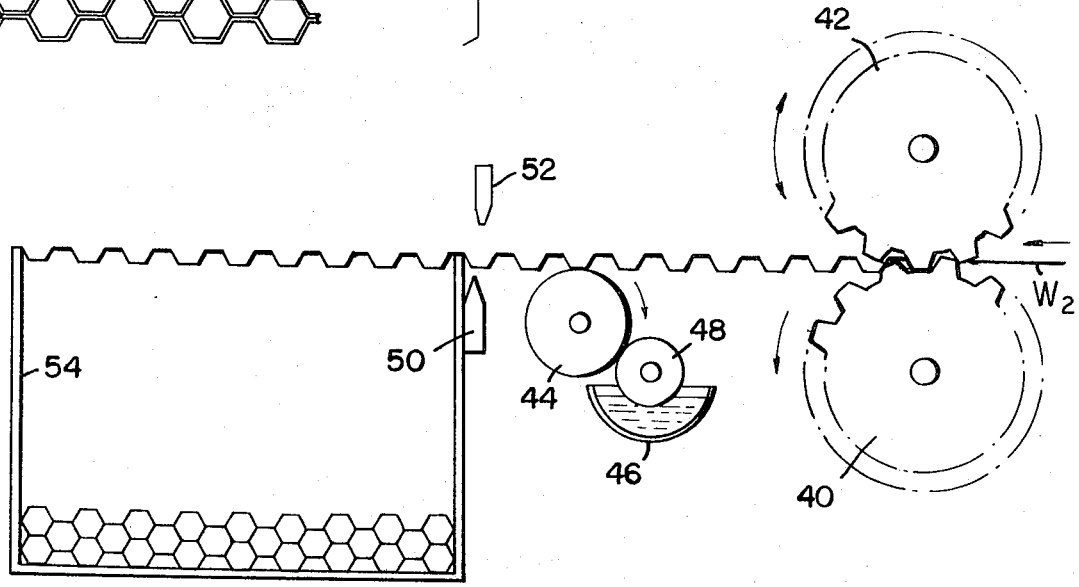
FIG_7
INVENTOR.
ROBERT G. NOBLE
BY
Townsend and Townsend
ATTORNEYS United States Patent Office 3,598,676
Patented Aug. 10, 1971

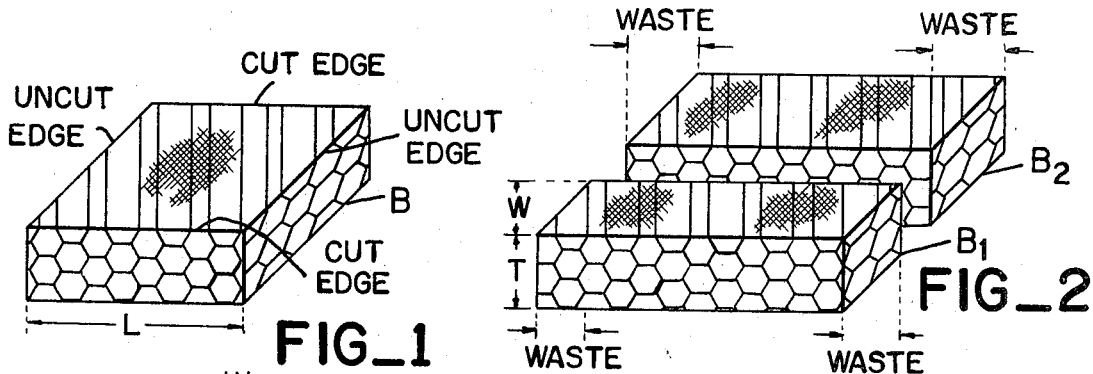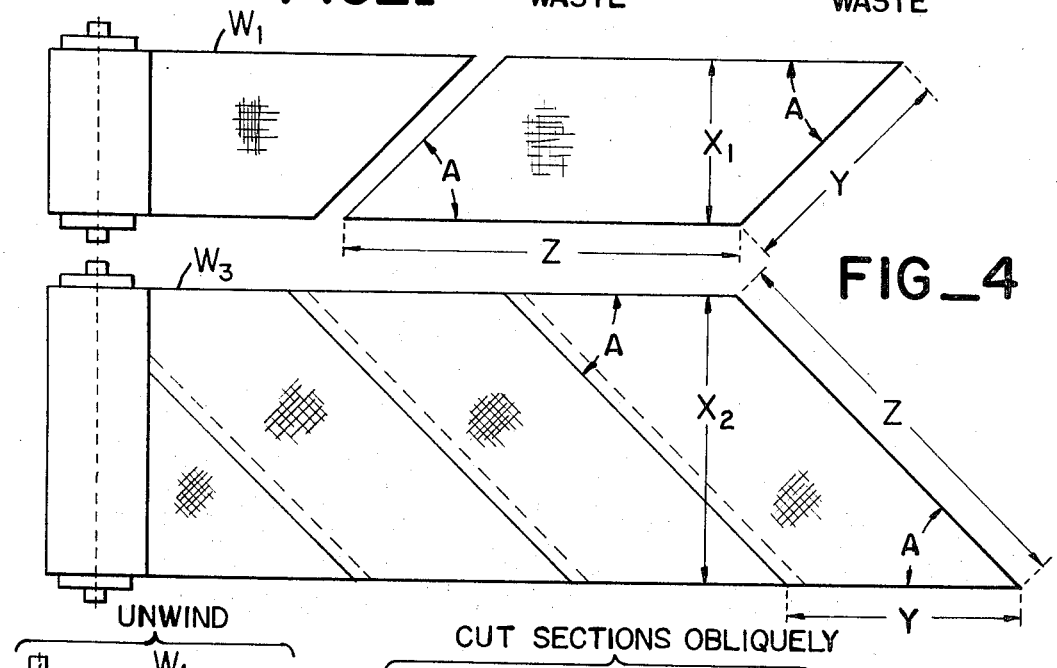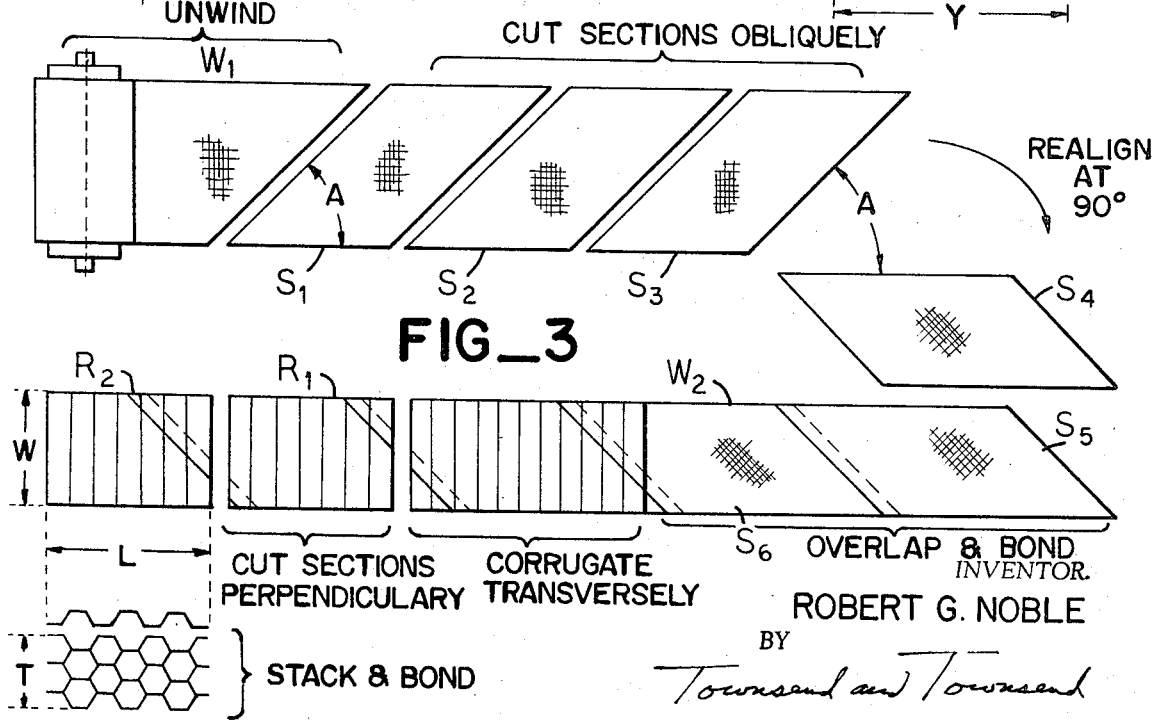

3,598,676
METHOD OF MAKING A BIAS WEAVE HONEYCOMB CORE STRUCTURE
Robert G. Noble, Castro Valley, Calif., assignor to Hexcel Corporation, Dublin, Calif.
Filed July 25, 1968, Ser. No. 748,117
Int. Cl. B31f 1/22
U.S. Cl. 156—205    8 Claims

ABSTRACT OF THE DISCLOSURE

A honeycomb core structure made of fabric reinforced material in which the warp and the woof of the fabric are disposed at an oblique angle to the longitudinal axes of the honeycomb cells. The core is manufactured by forming non-rectangular parallelogram shaped sections of fabric reinforced material with the warp and the woof of the fabric being disposed at an oblique angle to two sides of the parallelogram, joining the other two sides of adjacent parallelograms together in serial relationship to form a web in which the warp and woof of the fabric are disposed at an oblique angle to the lateral edges of the web, cutting the web at right angles to its lateral edge to form equal rectangular sections, superimposing a plurality of rectangular sections one upon another in a stack, and overlapping and adhering contiguous edges of the rectangular sections to one another along spaced parallel bonding lines with the bonding lines of adjacent superimposed sections being staggered relative to one another to define a plurality of adjacent cells whose longitudinal axes are parallel to each other and perpendicular to two sides of the superimposed rectangular sections.

BACKGROUND OF THE INVENTION

This invention relates to the manufacture of bias weave honeycomb core structures, i.e. core structures which are composed at least in part of a woven fabric material in which the warp and woof of the fabric are disposed at an oblique angle to the longitudinal axes of the honeycomb cells and in which the cell axes are perpendicular to the median plane of the core section. Bias weave honeycomb core structures per se are known in the prior art as disclosed, for example, in U.S. Pat. No. 3,321,355, which was issued on May 23, 1967 to K. M. Holland for "Fabric Reinforced Plastic Product and Method of Making Same." This invention is an improvement in the process disclosed in the above-noted patent and is principally concerned with reducing material wastage in the manufacturing process, eliminating the step of trimming waste material from the core structure, and providing greater flexibility with respect to the dimensions of core structures that can be manufactured from a given web of fabric reinforced material.

As disclosed in the above-noted patent, the prior art method of manufacturing bias weave honeycomb core comprised the steps of (A) making equally spaced oblique cuts across a web of fabric reinforced material to form a plurality of equal rhomboidal shaped sections in which the warp and woof of the fabric was disposed at an oblique angle to two sides of the rhomboid, (B) corrugating the rhomboidal shaped sections perpendicular to the oblique sides of the rhomboid to form half-cells in which the warp and the woof of the reinforcing fabric was disposed at an oblique angle to the longitudinal axes of the half-cells, (C) superimposing a plurality of the corrugated rhomboids one upon another in a stack; (D) adhering the superimposed rhomboids to each other along spaced apart parallel bonding lines with the bonding lines of adjacent superimposed rhomboids being staggered relative to one another to form a plurality of honeycomb cells in which the warp and the woof of the reinforcing fabric was disposed at an oblique angle to the longitudinal axes of the cells, and (E) slicing the honeycomb block thus formed along planes perpendicular to the longitudinal axes of the cells to form honeycomb core sections of a desired width. Then, since the honeycomb core sections had oblique corners instead of square corners, it was necessary to trim the corners and discard the triangular sections of honeycomb material that was cut away in the trimming process.

In addition to the obvious disadvantages of requiring a trimming operation, along with the waste material resulting therefrom, this prior art method had the additional disadvantage of limiting one dimension of the honeycomb core as a function of the width of the web from which the rhomboidal shaped sections were cut. If, for example, the rhomboidal shaped sections are cut at an angle A to the lateral edges of the web, the oblique sides of the sections are fixed at a length equal to $$\frac{X_1}{\sin A}$$

where $X_1$ is the width of the web. Thus, although the length of the other two sides of the rhomboidal shaped sections could be set to any desired value by varying the spacing of the oblique cuts across the web, the length of the oblique sides is fixed at a rigid value depending on the angle of the oblique cuts and the width of the web. Different values for these two sides can only be achieved by changing the angle of the oblique cut, which changes the orientation of the fabric with respect to the honeycomb cells, or by using a variety of different webs with differing widths.

Accordingly, it is the object of this invention to provide a novel method of manufacturing bias weave honeycomb core which eliminates the step of trimming waste material from the core structure, reduces wastage in the manufacturing process, and allows any desired size core structure to be formed from the same web of fabric reinforced material.

SUMMARY OF THE INVENTION

In accordance with this invention, it has been found that the above-noted objectives can be achieved by (A) making spaced oblique cuts across a web of fabric reinforced material to form non-rectangular parallelogram shaped sections with the warp and the woof of the fabric being disposed at an oblique angle to two sides of the parallelogram, (B) overlapping and joining the other two sides of adjacent parallelograms together in serial relationship at their contiguous edges to form a second web in which the warp and woof of the fabric are disposed at an oblique angle to the lateral edges of the web, (C) cutting the second web at right angles to its lateral edge to form equal rectangular shaped sections, (D) superimposing a plurality of rectangular sections one on top of another in a stack, and (E) adhering the rectangular sections to one another along spaced parallel bonding lines with the bonding lines of adjacent superimposed sections being staggered relative to one another to define a plurality of adjacent cells whose longitudinal axes are parallel to each other and perpendicular to two sides of the superimposed rectangular sections. Since the honeycomb core of this invention has square corners (with the exception, of course, of the first cut section which is trimmed off as waste) there is no necessity of a trimming operation and consequently no appreciable waste material resulting therefrom. Moreover, the width of the web being formed by joining the parallelogram sections together is independent of the width of the web from which the parallelogram sections are cut. This means that any desired size rectangular sections can be formed from the same basic web of fiber reinforced material.

BRIEF DESCRIPTION OF THE DRAWINGS

FIG. 1 is a perspective view of a prior art bias weave honeycomb core structure.

FIG. 2 is a perspective view of the prior art honeycomb core structure of FIG. 1 sliced along a plane perpendicular to the longitudinal axes of the honeycomb cells.

FIG. 3 is a flow diagram of one illustrative method of this invention.

FIG. 4 is a plan view of a web of bias weave material formed in accordance with this invention.

FIG. 5 is a perspective view of lithographic equipment for printing adhesive lines on the bias weave web of FIG. 4 and for cutting the printed web into rectangles.

FIG. 6 shows a superimposed stack of rectangles of FIG. 5 adhered to one another.

FIG. 6a shows the rectangle stack of FIG. 6 expanded to form honeycomb cells.

FIG. 7 is a diagrammatic illustration of means for corrugating the bias weave web of FIG. 3, cutting the corrugated web into rectangular sections, and adhering the corrugated rectangular sections together in a stack.

DESCRIPTION OF THE INVENTION

FIG. 1 shows a prior art block of bias weave honeycomb core material B formed from corrugated rhomboidal shaped sections in which the warp and woof of the reinforcing fabric are disposed at an oblique angle to the cut edges of the rhomboid, i.e. the edges formed by making spaced oblique cuts across the lateral edges of a web of fabric reinforced material. The lateral edges of the web comprise the uncut edges of the rhomboid. The corrugations are perpendicular to the cut edge of the rhomboid, thus orienting the axes of the honeycomb cells at an oblique angle to the warp and woof of the reinforcing fabric. The rhomboidal shaped sections are superimposed one upon another in a stack and are adhered together along staggered bonding lines to form the honeycomb core block B. The distance between the cut edges of block B can be set to any desired value by varying the spacing of the cuts, but the length L of the cut edges is fixed at a value of $$X_1/\sin A$$

where $X_1$ is the width of the web from which the rhomboidal shaped sections are cut and A is the oblique angle at which the web is cut.

FIG. 2 shows the honeycomb block B of FIG. 1 cut into two sections $B_1$ and $B_2$ by slicing the block along a plane perpendicular to the honeycomb cell axes. The volume of waste material which must be trimmed away to square the oblique corners of the sections is equal to $$\frac{W^2}{2 \tan A} T$$

where W is the width of the section, T is the thickness of the section, and A is the angle of the corner. As can be seen from the equation, the amount of waste increases as the square of the width W and becomes very substantial for relatively wide sections such as $B_2$.

FIG. 3 shows one illustrative method of this invention in diagrammatic form with the means for performing the various steps of the method being omitted for the sake of clarity. A web $W_1$ of fabric reinforced material is provided in which the warp of the fabric is parallel to the lateral edge of the web. The material can be woven glass cloth which is impregnated with plastic or any other suitable fabric reinforced material. The web $W_1$ is cut into a plurality of equal non-rectangular parallelogram shaped sections $S_1 \ldots S_6$ by making equally spaced cuts at an oblique angle A to the lateral edges of the web. In the example shown in FIG. 1, the value of A is equal to 45°, but its value can vary from approximately 20° to 60°.

The parallelogram shaped sections are then rotated by an angle A and their uncut edges are overlapped and adhesively bonded together to form a second web $W_2$ in which the warp and the woof of the reinforcing fabric are disposed at the oblique angle A to the lateral edges of the web. Section $S_4$ is shown as being rotated through the angle A, and sections $S_5$ and $S_6$ are shown as overlapped and bonded together. The web $W_2$ is then corrugated perpendicular to the lateral edge of web $W_2$ and cut into equal rectangular sections $R_1-R_2$ having a desired length L. The width W of rectangles $R_1-R_2$ is, in this example, equal to the width of web $W_2$, which in turn is dependent upon the spacing of the oblique cuts across web $W_1$ and the angle A at which the oblique cuts are made. The rectangles $R_1-R_2$ are cut so as to stagger the corrugations between adjacent rectangles so that the corrugations will fit together to form honeycomb cells when the rectangles are superimposed one upon another in a stack and adhered together to form a honeycomb core having a desired thickness T.

It should be noted that the joined edges of the parallelogram sections will normally fall in different locations in each of the rectangular sections, thereby distributing the joined edges at random through the honeycomb core. The dispersion of location for the joined edges will, however, be enhanced in the case where the length L of the rectangular sections is a non-integral multiple (or factor) of the length of the parallelogram sections which make up web $W_2$.

FIG. 4 shows how a wider web $W_3$ can be made from the same web $W_1$ using the same angle A by varying the spacing Z between the oblique angle cuts. In mathematical terms, the width of web $W_3$ can be expressed as $X_2 = Z \sin A$ and the spacing of the oblique cuts can be expressed as $$Z = \frac{X_2}{\sin A}$$

It will be noted that the width $X_2$ is completely independent of the width $X_1$ and can be set to any desired value within reasonable limits by simply varying the spacing Z between the oblique cuts. The length of the cut side Y of the parallelogram is equal to $$X_1/\sin A$$

and the length of web $W_3$ is equal to $$NX_1/\sin A$$

where N is the number of parallelogram shaped sections in the web.

FIG. 5 shows rotogravure equipment for printing parallel adhesive lines on the web $W_3$ and for cutting web $W_3$ up into rectangular sections to be stacked together in a pile and adhered together as indicated in FIG. 6. After the adhesive has set, the structure is expanded to form a honeycomb section as shown in FIG. 6a. The equipment shown in FIG. 5 and the arrangement of bond lines shown in FIGS. 6 and 6a are not part of this invention but are rather disclosed in U.S. Pat. No. 2,983,640, which was issued on May 9, 1961 to H. L. Knoll et al. for "A Method of Making Honeycomb" FIGS. 5, 6 and 6a of this application correspond exactly to FIGS. 1, 2 and 2a of Pat. No. 2,983,640 except for the use of a web of bias weave material $W_3$. Web $W_3$ over drum 13 which prints spaced parallel adhesive lines 21 on one surface of the web. As shown in FIGS. 6 and 6a, the space between the adhesive lines 21 is approximately three times the width of the adhesive lines. The web is then cut into rectangular sections by cutter drum 23 with the spacing of the adhesive lines being staggered between adjacent rectangles as shown in the drawings. The stacked rectangular sections are then adhered together as shown in FIG. 6 and expanded to form a honeycomb section as shown in FIG. 6a. For further details of the above described known process, reference may be made to U.S. Pat. No. 2,983,640 by way of illustration and example. There are other known ways for printing, cutting and stacking web material to form blocks or slices of unexpanded honeycomb that can also be used, and this invention is not limited to any one specific known means of accomplishing the printing, cutting and stacking operations.

FIG. 7 is a diagrammatic representation of means for corrugating the bias weave web $W_2$ of FIG. 3, for cutting the corrugated web into rectangular sections, and for adhering the rectangular sections together in a stack. The web $W_2$ is passed between corrugating rollers 40 and 42 which corrugate the web in half-cell pattern. An adhesive is applied to the bottom of the corrugations by an adhesive roller 44 which picks up adhesive from a container 46 via another roller 48. The corrugated web is then cut into rectangular sections by a guillotine, rotary cutter or other suitable cutting means 50 and 52 and the rectangular sections then stacked one on top of the other within a container 54 and adhered together in honeycomb form. For further details of similar known processes to which this invention is not limited, reference is made to U.S. Pats. No. 3,321,355 and No. 3,356,555.

It is appreciated that the method of producing the product herein described may be accomplished by hand or in other ways and on other equipment than herein described, and the particular apparatus and sequences described in this application have been set forth by way of example and it is understood that many changes and modifications may be practiced within the spirit of the invention and the scope of the appended claims.

I claim:
1. A method of manufacturing bias weave honeycomb core from a relatively thin flexible material which is composed at least in part of woven fabric in which the warp and woof are substantially perpendicular to each other, comprising the steps of:
 (A) forming a plurality of non-rectangular parallelogram shaped sections of said material each having first and second sides which are substantially parallel to each other and to the warp or woof of said fabric, and third and fourth sides which are substantially parallel to each other and disposed at an oblique angle to the warp and woof of said fabric, the distance between the third and fourth sides of each section being substantially equal;
 (B) joining the first and second sides of said parallelogram shaped sections together in serial relationship to form a web having a width equal to the distance between the third and fourth sides of one of said sections and a length approximately equal to the sum of the first sides of all sections which are joined together in serial relationship, the third and fourth sides of said joined sections forming the lateral edges of said web;
 (C) cutting a plurality of equal rectangular shaped sections from said web, two sides of each rectangular section being cut perpendicular to the lateral edges of the web;
 (D) superimposing a plurality of said rectangular sections one upon another in a stack; and
 (E) adhering said plurality of rectangular sections to one another along spaced apart bonding lines which are substantially parallel to each other and perpendicular to two sides of said superimposed rectangular sections, the bonding lines of adjacent superimposed sections being staggered relative to one another to form a plurality of adjacent cells having longitudinal axes which are substantially parallel to each other and perpendicular to two sides of said superimposed rectangular sections, thereby forming a bias weave honeycomb core structure in which the warp and the woof of said fabric are disposed at an oblique angle to the longitudinal axes of said cells.

2. The method defined in claim 1 wherein said relatively thin flexible material is provided in the form of a web having substantially parallel lateral edges with the warp or the woof of the fabric therein being substantially parallel to said lateral edges, and wherein said parallelogram shaped sections are formed by making spaced cuts across said web at an angle of approximately 45° to the lateral edges thereof, and the spacing between said cuts being approximately equal to $$X_2/\sin 45°$$

where $X_2$ is the desired width of the web formed by joining the first and second sides of said parallelogram shaped sections together in serial relationship.

3. The method defined in claim 2 wherein the length of the last mentioned web is approximately equal to $$NX_1/\sin 45°$$

where $N$ is the number of parallelogram shaped sections in said web and $X_1$ is the width of the web from which said parallelogram shaped sections were cut.

4. The method defined in claim 1 wherein the warp and woof of said fabric are disposed at an angle of approximately 45° to the third and fourth sides of said parallelogram shaped sections, thereby forming a honeycomb core in which the warp and the woof of said fabric are disposed at an angle of approximately 45° to the longitudinal axes of said cells.

5. The method defined in claim 4 wherein said woven fabric material is impregnated with a plastic material and wherein the joined edges of said parallelogram shaped sections are overlapped and bonded together.

6. The method defined in claim 1 and further comprising the step of forming spaced parallel corrugations in said web before cutting it into rectangular shaped sections, said corrugations being dimensioned to form half-cells for said honeycomb core and being disposed perpendicular to the lateral edges of said web, and the corrugated web being cut into equal rectangular shaped sections in which the corrugations of adjacent sections are staggered with respect to each other so that the half-cells of adjacent sections will match when the sections are superimposed one upon another and adhered together to form said bias weave honeycomb core.

7. The method defined in claim 1 and further comprising the step of applying spaced parallel lines of adhesive to said web before cutting it into rectangular shaped sections, said adhesive lines being spaced to define half-cells for said honeycomb core and being disposed perpendicular to the lateral edges of said web, and said web being cut into equal rectangular shaped sections in which the adhesive lines of adjacent sections are staggered with respect to each other so that the half-cells of adjacent sections will match when the sections are superimposed one upon another and adhered together to form said bias weave honeycomb core.

8. The method defined in claim 1 and further comprising the step of cutting said bias weave honeycomb core along a plane which is substantially perpendicular to the longitudinal axes of said cells to form a smaller bias weave honeycomb core structure.

References Cited
UNITED STATES PATENTS

| | | | |
|---|---|---|---|
| 2,594,838 | 4/1952 | Alexander et al. | 156—89 |
| 2,983,690 | 5/1961 | Knoll et al. | 156—197 |
| 3,006,798 | 10/1961 | Holland | 156—197 |
| 3,114,666 | 12/1963 | Johnson | 156—197 |
| 3,205,109 | 9/1965 | Schudel | 156—197 |
| 3,321,355 | 5/1967 | Holland | 156—197 |

SAMUEL W. ENGLE, Primary Examiner

U.S. Cl. X.R.

156—197, 210, 265; 161—68